United States Patent [19]

Frost

[11] Patent Number: 5,085,303
[45] Date of Patent: Feb. 4, 1992

[54] DRAG-FREE STRUT-TYPE SYNCHRONIZER

[75] Inventor: Barry L. Frost, DeWitt, N.Y.

[73] Assignee: New Venture Gear, Inc., Troy, Mich.

[21] Appl. No.: 591,129

[22] Filed: Oct. 1, 1990

[51] Int. Cl.$^5$ ............................................. F16D 23/06
[52] U.S. Cl. ..................................... 192/53 F; 74/339
[58] Field of Search ................ 192/53 F, 53 G, 53 E, 192/48.91; 74/339

[56] References Cited

U.S. PATENT DOCUMENTS

| Re. 23,018 | 7/1948 | Brownyer | 192/48.91 |
|---|---|---|---|
| 2,785,783 | 3/1957 | Homrig et al. | 192/48.91 X |
| 2,846,038 | 8/1958 | Brownyer | 192/48.91 |
| 3,247,937 | 4/1966 | Ivanchick | 192/53 F |
| 4,566,568 | 1/1986 | Yant | 192/53 F |
| 4,573,371 | 3/1986 | Akutagawa | 74/339 |
| 4,732,247 | 3/1988 | Frost | 192/53 F |
| 4,817,772 | 4/1989 | Sacher | 192/48.91 |
| 4,878,571 | 11/1989 | Sacher | 192/48.91 |

FOREIGN PATENT DOCUMENTS

| 2222077 | 11/1973 | Fed. Rep. of Germany | 192/53 G |
|---|---|---|---|
| 2142390 | 1/1985 | United Kingdom | 192/53 E |

Primary Examiner—Rodney H. Bonck
Attorney, Agent, or Firm—Harness, Dickey & Pierce

[57] ABSTRACT

The present invention, in its disclosed embodiment, is a strut-type synchronizer including a shift sleeve having a modified internal splined surface profile adapted to coact with the struts to counteract normal drag forces produced upon axial movement of the shift sleeve during shifting of gears. In a preferred form, the spline tooth "profile" modification includes the addition of two ramped surfaces circumferentially extending around the inner bore of the shift sleeve on opposite sides of the detent groove and which are in communication therewith. These ramped surfaces act to change the radially directed engagement force between the struts and the applied surface of the shift sleeve into an axially directed force for assisting axial sleeve travel to minimize frictional shift resistance.

10 Claims, 4 Drawing Sheets

DRAG-FREE STRUT-TYPE SYNCHRONIZER

BACKGROUND OF THE INVENTION

The present invention relates to gear synchronizer mechanisms and, more particularly, to strut-type synchronizers having reduced drag force for promoting improved shift feel.

In general, conventional strut-type synchronizers include a plurality of key-like struts which are normally biased into engagement with a circumferential detent groove formed in the internal splined surface of the shift sleeve. Axial displacement of the shift sleeve causes the struts to energize the synchronizer mechanism for blocking further axial displacement of the shift sleeve until speed synchronization is complete. For example, U.S. Pat. No. 4,566,568 issued Jan. 28, 1986 to Yant discloses a strut-type synchronizer having a leaf spring member radially interposed between the hub and the shift sleeve which is adapted to bias the strut radially outwardly into engagement with the detent groove formed in the inner bore of the shift sleeve.

U.S. Pat. No. 4,770,280 issued Sept. 13, 1988 to Frost and assigned to the common assignee of the instant application discloses a strut-type blocking synchronizer mechanism which is incorporated into a vehicle transfer case for shifting from a two-wheel drive mode to a four-wheel drive mode. The synchronizer mechanism includes a pair of energizing retainer springs acting to radially outwardly bias the struts confined within slots in the hub into engagement with the detent groove. Likewise, U.S. Pat. No. 4,445,602 issued May 1, 1984 to Chana discloses a similar strut-type synchronizer arrangement utilized in a manual transmission.

A principle drawback associated with most conventional strut-type synchronizers however, is poor "shift feel" when compared to strutless type synchronizers. This is due largely to the excessive drag forces generated by the energizing springs for maintaining biased engagement of the struts and the shift sleeve splines upon continued axial movement of the shift sleeve following completion of speed synchronization. Currently, the vehicle operator must physically overcome this frictional drag force by exerting a greater counteracting force to the gear shift lever for completing the gear shift. As such, the vehicle operator is unable to advance the gear shift lever smoothly to complete gear lock-up without experiencing some undesirable shifting resistance.

SUMMARY OF THE INVENTION

It is therefore an object of the present invention to overcome the disadvantages associated with the prior art by providing an improved gear synchronizer clutch mechanism which substantially reduces the drag forces generated during gear shifting operation.

It is a further object of this invention to provide an improved gear synchronizer clutch mechanism which is designed to produce an axial "assisting" force acting on the shift sleeve when moving into a gear upon completion of speed synchronization for promoting improved "shift feel".

The present invention, in its disclosed embodiment, is a strut-type synchronizer including a shift sleeve having a modified internal splined surface profile adapted to coact with the struts to counteract normal drag forces produced upon axial movement of the shift sleeve during shifting of gears. In a preferred form, the spline tooth "profile" modification includes the addition of two ramped surfaces circumferentially extending around the inner bore of the shift sleeve on opposite sides of the detent groove and which are in communication therewith. These ramped surfaces act to change the radially directed biased engagement force between the struts and the splined surface of the shift sleeve into an axially directed force for assisting axial sleeve travel.

BRIEF DESCRIPTION OF THE DRAWINGS

Further objects, features and advantages of the present invention will be apparent from the following description and accompanying drawings in which.

DETAILED DESCRIPTION OF THE INVENTION

Figure 1:
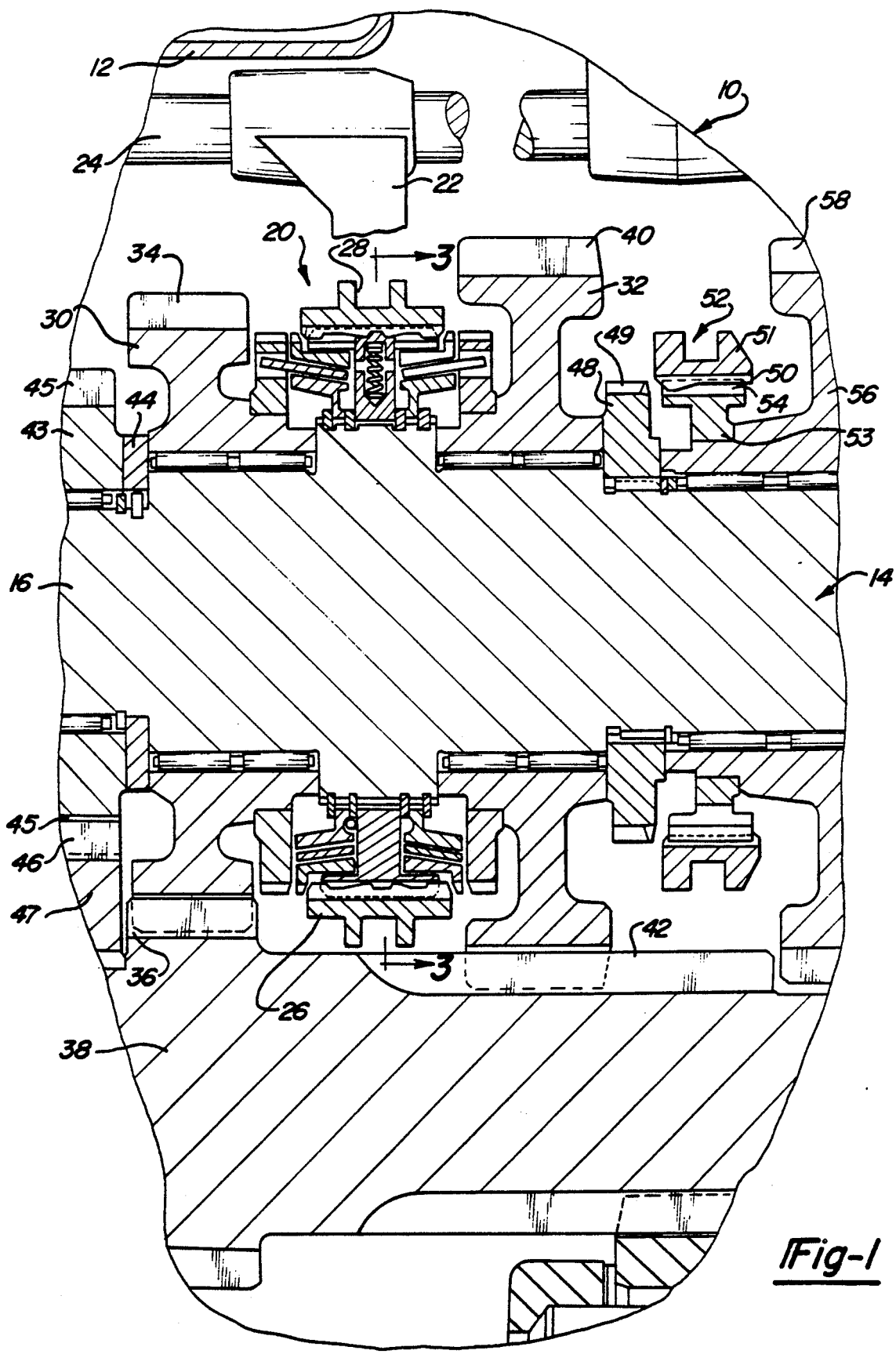
FIG. 1 is a vertical cross-sectional fragmentary view of a portion of a manual transmission equipped with the improved synchronizing mechanism of the present invention.
Figure 2:
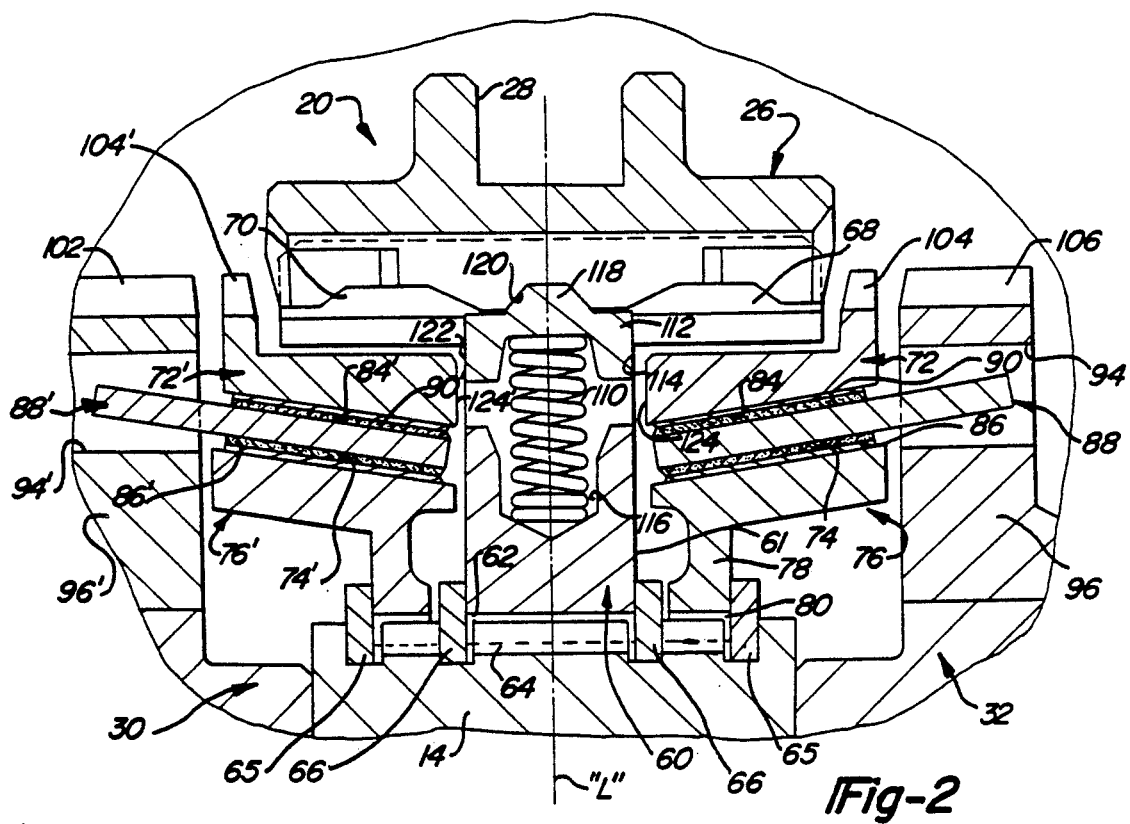
FIG. 2 is an enlarged fragmentary cross-sectional view of a portion of the synchronizer mechanism shown in FIG. 1.
Figure 3:
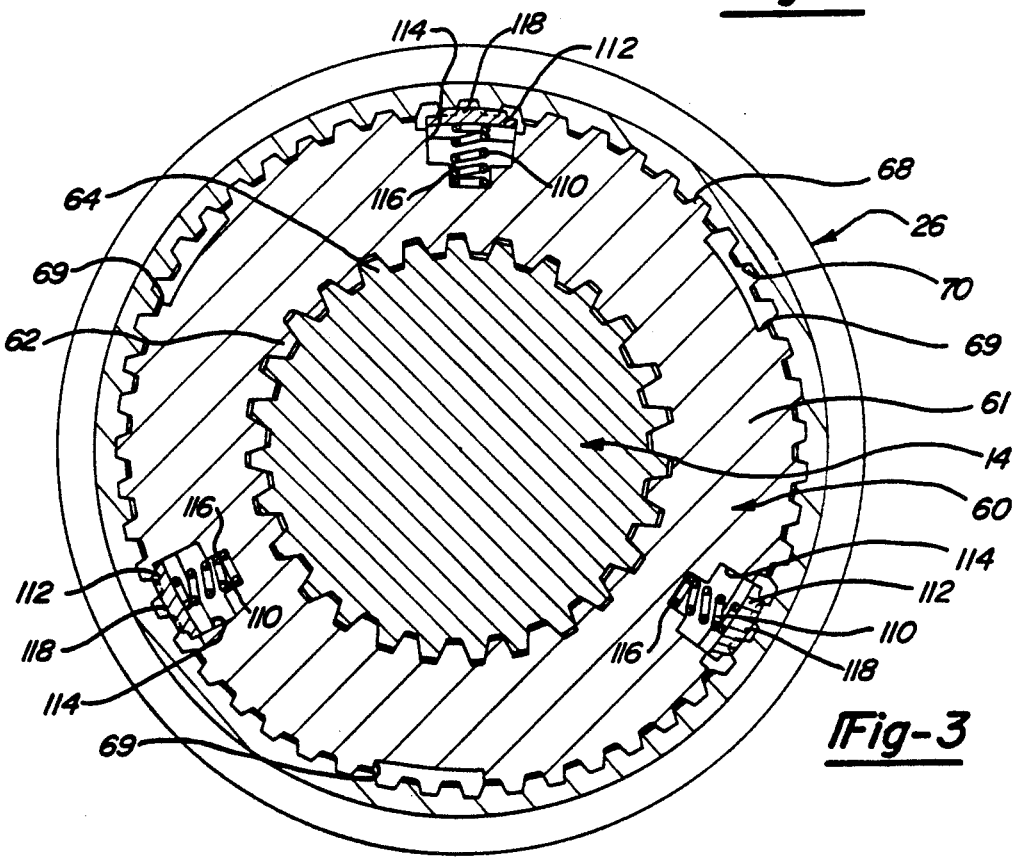
FIG. 3 is a vertical cross-sectional view taken along line 3—3 of FIG. 1.

With particular reference to FIGS. 1 and 2, a portion of a five-speed motor vehicle manual transmission is shown generally at 10. Reference may be had to U.S. Pat. No. 4,677,868, issued Jul. 7, 1987 to T. J. Filkins, and assigned to the assignee of the present application for a more detailed description of an exemplary manual transmission suitable for use with the present invention. The transmission includes a gear box housing, partially shown at 12, journally supporting an input shaft (not shown). The input shaft is connected by suitable clutch means to a motor vehicle engine crankshaft (not shown) journally supported in a circular housing opening as described in the above-mentioned Filkins patent.

A transmission output or main shaft, shown at 14 in FIG. 1, has a forward pilot end 16 of reduced diameter which is coaxially journaled within an axial blind bore of the input shaft while a forward bearing assembly supports the forward end of main shaft 14 in housing 12. Again, such conventional structure is shown and thoroughly described in the above-mentioned Filkins patent. One or more synchromesh clutch units 20 such as the unit shown in FIG. 1 as double-acting double-sided or bi-directional clutch mechanism 20, are mounted on main shaft 14. Clutch unit 20 is actuated by means of a shift fork, partially indicated at 22, which is supported on gear box shift selector rail 24. Thus, shift fork 22 is longitudinally slidable with its selector rail 24 and is connected by a yoke portion (not shown) to shift sleeve 26 of synchronizer unit 20 by means of a circumferential external groove 28.

In the disclosed embodiment, synchronizer unit 20 is commonly referred to as a "strut-type" unit. It is to be understood that while the "strut-type" synchronizer 20 of the present invention is shown incorporated in a bi-directional synchronizer arrangement, could likewise be incorporated into a uni-directional clutch without departing from the fair scope of the present invention. Thus, for example, a "strut-type" synchronizer could be used in a uni-directional synchronizer clutch for a transmission reverse gear drive. It is likewise to be understood that the present invention is readily adaptable for use with most single or multiple cone synchronizer mechanisms.

Synchronizer unit 20 is depicted intermediate a transmission second speed gear 30 and a first speed gear 32 both of which are journally supported on output shaft 14. Second speed gear 30 has its gear teeth 34 in constant meshing engagement with external spline teeth 36 formed on transmission countershaft 38. Countershaft 38 is disposed parallel to main shaft 14 and is suitably journally supported in housing 12. In a like manner, first speed gear 32 has its teeth 40 in constant meshing engagement with external spline teeth 42 formed on countershaft 38. It will be noted that a portion of a transmission third speed gear 43 is separated from second speed gear 30 by thrust washer 44 and third speed gear teeth 45 are in constant mesh with teeth 46 of drive gear 47 fixed, as by splines, on countershaft 38.

Further, a reverse clutch gear 48 is splined on main shaft 14 and has an external spline tooth surface 49 adapted to engage internal splines 50 on shift sleeve 51 of a transmission reverse clutch unit indicated generally at 52. Reverse clutch unit 52 has its hub 53 formed with external splined tooth surface 54, slidably receiving reverse sleeve internal spline 50. Hub 53 is fixed on main shaft reverse speed gear 56 which is shown journally supported on main shaft 14 by needle bearings. Reverse speed gear 56 has its toothed surface 58 spaced from countershaft 38 in constant mesh with a conventional reverse idler gear (not shown).

As best seen in FIG. 2, strut-type synchronizer unit 20 includes a hub 60 having an inner web 61 fixed to main shaft 14 through hub internal splines 62 engaging main shaft external splines 64. A first pair of snap rings 65 are provided to retain associated inner cone rings, to be described, while a pair of second snap rings 66 are provided to axially position and maintain hub 60 on main shaft 14. Shift sleeve 26 is mounted for rotation with hub 60 by mean of hub external splined tooth surface 68, slidably engaging internal sleeve splined surface 70. Thus, shift sleeve 26 is axially movable in a fore or aft direction on hub 60 by means of shift fork 22. It will be noted in FIG. 4 that hub external splined tooth surface 68 is formed with three equally spaced notches 69 extending toward web 61 for reasons to be explained below.

Synchronizer clutch unit 20 is shown as a dual cone "strut-type" synchronizer device having two cone surfaces and two mating friction blocking surfaces for each of its associated first and second speed gears 32 and 30, respectively. Since bi-directional unit 20 is symmetrical about a central transverse plane of construction line "L" in FIG. 2, like numbers will be used to describe right and left hand mirror image parts, with the left hand parts being primed. Thus, the operation of only the right hand first speed clutch assembly of the synchronizer clutch unit 20 will be described in detail.

Figure 4:
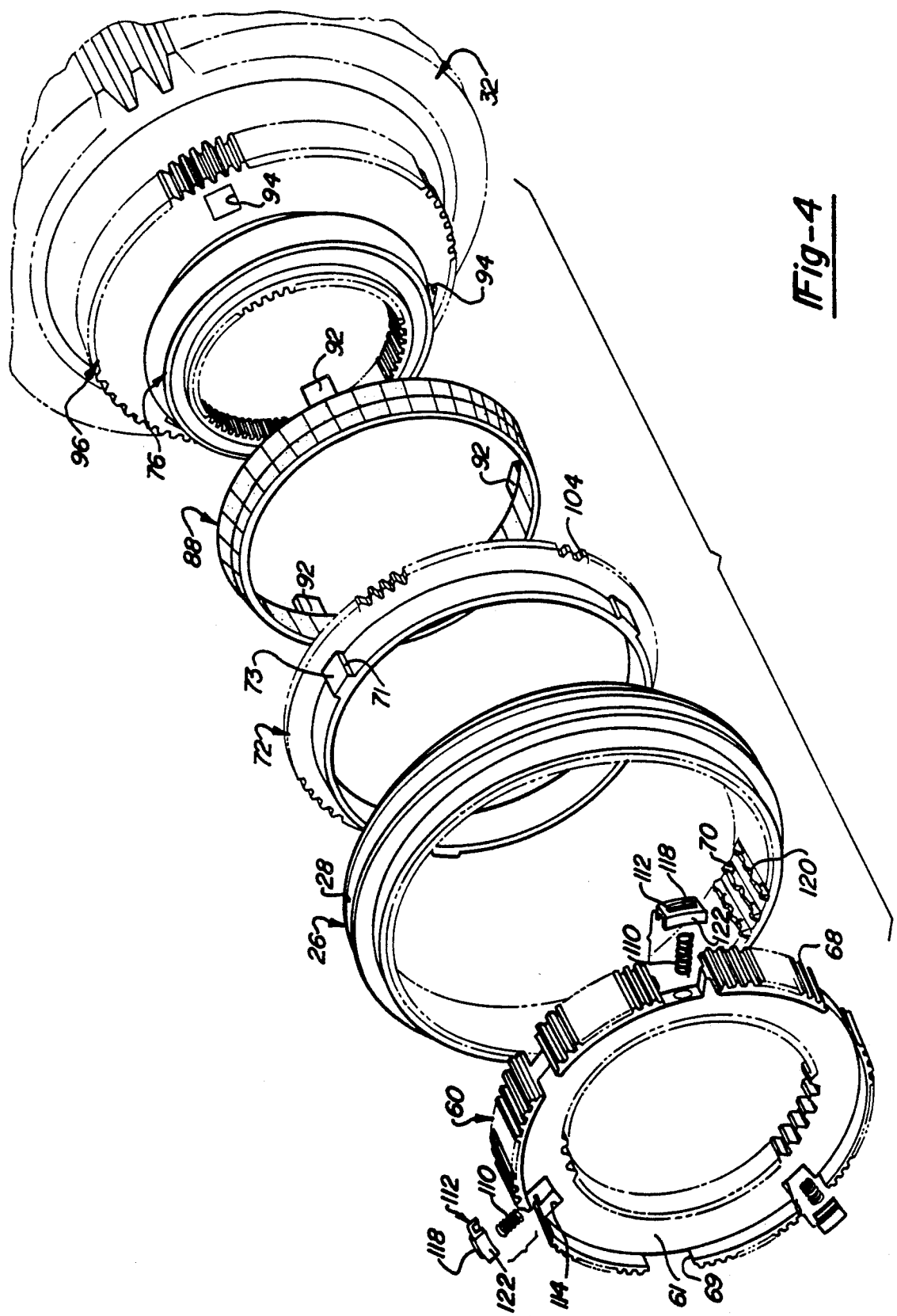
FIG. 4 is an exploded perspective view of the synchronizer hub, strut and shift sleeve components together with the first speed gear coupling components shown in FIG. 1.

With particular reference to FIGS. 2 and 4, synchronizer unit 20 is shown to include a pair of fore and aft (i.e., left and right) mirror image blocker rings 72' and 72, respectively. Blocker ring 72 is provided with three raised lugs 73 equally spaced at 120° intervals there around. Each lug 73 is adapted to nest within its associated hub notch 69. Thus, during indexing or "clocking" of blocker ring 72, lugs 73 have their respective side faces 71 in contact with an edge of notch 69.

FIGS. 2 and 4 show a first external cone surface 74 formed on each inner cone rings 76. As best seen in FIG. 2, inner cone ring 76 has a cylindrical portion 78 with internal splines 80 engaged with external splines 64 on main shaft 14. A second external cone surface 84 is provided on blocker ring 72. A first internal conical blocking surface 86 is located on the interior of middle cone ring 88, while a second external conical blocking surface 90 is located on the exterior of middle cone ring 88. First internal blocking surface 86 is adapted to contact first external cone surface 74 while second external blocking surface 90 is adapted to contact second internal cone surface 84. It will be noted that in the disclosed embodiment, each of blocking surfaces 86 and 90 are in the form of a friction pad or lining bonded or cemented to its associated metal cone ring surface for providing effective frictional engagement. An example of one type of suitable friction lining that may be used with the present invention is disclosed in U S. Pat. No. 4,267,912 issued May 29, 1981 to Bauer, et al, the disclosure of which is expressly incorporated by reference herein.

As best seen in FIG. 4, middle cone ring 88 has three axially directed torque drive tangs 92 formed integral therewith and uniformly spaced on 120° centers. Drive tangs 92 extends rearwardly and engages in an associated axially positioned window 94 formed in a flange portion 96 extending radially from and fixed to first speed gear 32. Similarly, torque drive tangs 92' extend forwardly and engage in an associated axially positioned window 94' formed in flange portion 96' extending radially from and fixed to second speed gear 30. Reference may be had to U.S. Pat. No. 4,732,247 issued Mar. 22, 1988 to B. L. Frost for detailed description of cone ring drive tangs of the general type used in the present invention.

Flange portion 96' of second speed gear 30 has a spline surface 102 which is coaxial and alignable with a spline surface 104' formed on a raised outer circumference portion of synchronizer blocker ring 72'. Both spline surfaces 102 and 104' are engagable with shift sleeve internal splined surface 70, which splines are in continual engagement with hub external splines 68, upon shift sleeves 26 being shifted leftwardly into its second speed gear mode. In a like manner, first speed gear 32 has a flanged portion 96 having a spline surface 106 coaxial and alignable with spline surface 104 of blocker ring 72. Both splined surfaces 106 and 104 are engagable by shift sleeve internal splined surface 70 upon shift sleeve 26 being shifted rightwardly into its first speed gear mode.

Figure 5:
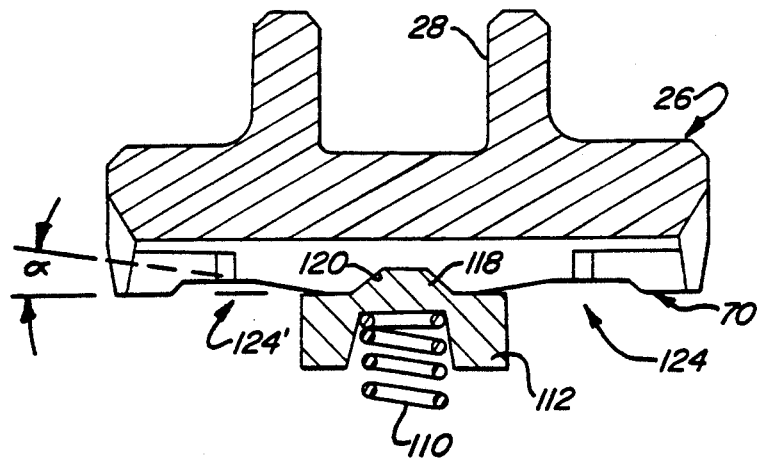
FIG. 5 is an enlarged view illustrating the interaction of the shift sleeve and strut of FIG. in a "neutral" position.

Shift sleeve 26 of synchronizer mechanism 20 is shown in FIGS. 1, 2 and 5 in a central disengaged or "neutral" position. Since spline teeth 70 of shift sleeve 26 are in constant axial sliding engagement with external splined teeth 68 formed on hub 60, shift sleeve 26 may be manually shifted to the right or left to complete lock-up of first or second speed gears, respectively, such that internal splined tooth surface 70 drivingly engage external spline teeth 106 and 102, respectively.

In strut-type blocking synchronizer 20, a thrust mechanism is shown to include helical compression springs 110 which are compressed and inserted between a plurality of circumferentially spaced key-like "struts" 112. In the particular embodiment shown, three (3) struts 112 are uniformly spaced on 120° centers and are biased radially outwardly in their respective longitudinally extending slots 114 formed in hub web 61. A portion of compression springs 110 are disposed within a spring seat bore 116 extending into hub web 61. Struts 112 each have a raised central stop projection or "hump" portion 118 which engage a corresponding central detent groove 120 circumferentially formed in shift sleeve internal spline teeth 70 when shift sleeve 26 is in its "neutral" position.

Compression springs 110 are sized to produce a predetermined compressive force for biasing struts 112 in a radially outward direction for permitting struts 112 to move in an axial direction upon axial movement of shift sleeve 26. For example, initial leftward axial movement of shift sleeve 26 toward second spaced gear 30 causes struts 112 to correspondingly move axially in the same direction until a longitudinal end face 122 of struts 112 engages a facing end surface 124' of blocker ring 72'. In particular, springs 110 bias struts 112 into maintained engagement with detent groove 120 such that both shift sleeve 26 and strut 112 move out of the central position (construction line "L") of FIG. 2. As is known in the synchronizer art, engagement of struts 112 with end face 124' of blocker ring 72' generates initial frictional cone torque loading between blocker ring interior cone surface 84' and outer cone ring exterior blocking surface 90'. As such, outer blocking ring 72' is "clocked" to an indexed position preventing continued axial displacement of shift sleeve 26 until synchronization is complete. With blocker ring 72' in its indexed position, sleeve 26 moves to a chamfer-to-chamfer loading position between the opposed faces of exterior tooth surface 104' on blocker ring 72' and shift sleeve interior spline teeth 70.

When the speed of second speed gear 30 relative to blocker ring 72' and shift sleeve 26 approaches zero, the cone torque falls to zero. Synchronization is now complete and blocker ring 72' is no longer energized since the index torque resulting from the chamfer-to-chamfer loading between sleeve internal splines 70 and blocker ring teeth 104' now exceeds the cone torque, blocker ring 72' rotates in a opposite direction and out of its "clocked" position. Thereafter, second speed gear 30 rotates aside to pass sleeve internal splines 70 beyond blocker ring teeth 104' until initial locked contact is made between sleeve spline teeth 70 and second gear exterior teeth 102. As will be appreciated, similar interaction of the components associated with the right half of clutch unit 20 occurs during rightward axial movement of shift sleeve 26 for shifting into engagement with first speed gear 32.

With particular reference now to FIGS. 5 through 8, a modified spline tooth profile for internal splines 70 of shift sleeve 26 is shown which provides a significant improvement in the strut-type synchronizer art. According to the teachings of the present invention, spline teeth 70 are configured to include first and second longitudinally extending ramped surfaces or grooves 124 and 124', respectively, which are formed on opposite sides of detent groove 120. Ramped grooves 124 and 124' are each formed to extend circumferentially and to communicate with detent groove 120. More particularly, ramped grooves 124 and 124' include upwardly and outwardly extending inclined ramp surfaces 130 and 130', respectively provided adjacent detent groove 120. Grooves 124 and 124' are adapted to engage hump 118 of struts 112 upon continued axial displacement of shift sleeve 26 following hump 118 being moved out of detent groove 120 and the neutral position. At the end of ramp inclined surfaces 130 and 130', axially extending flat surfaces 132 and 132', respectively, are provided which terminate in down-turned stop surfaces 134 and 134', respectively. The stop surfaces 134 and 134' are configured to retain hump 118 and, in turn, struts 112 within ramped grooves 124 and 124', at the end of maximum axial travel of shift sleeve 26.

Figure 6:
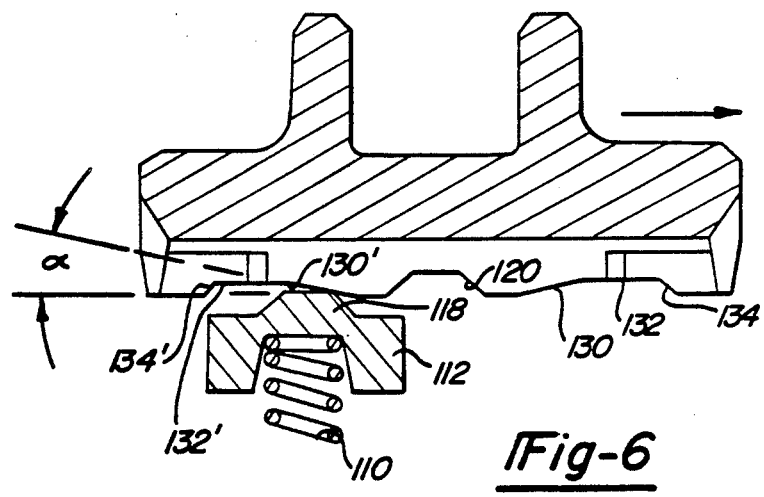
FIG. 6 is similar to FIG. 5 except that it illustrates continued axial movement of the shift sleeve relative to the strut following synchronization.
Figure 8:
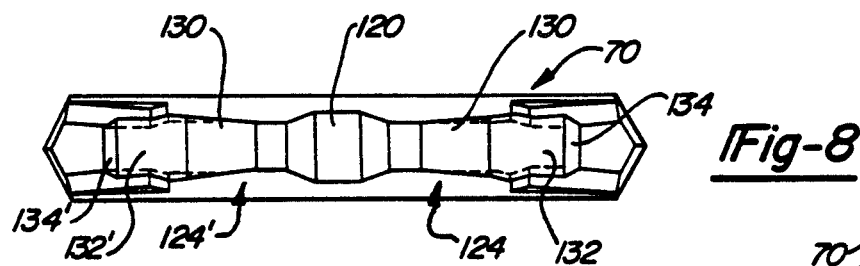
FIG. 8 is a plan elevational view of FIG. 7.
Figure 7:
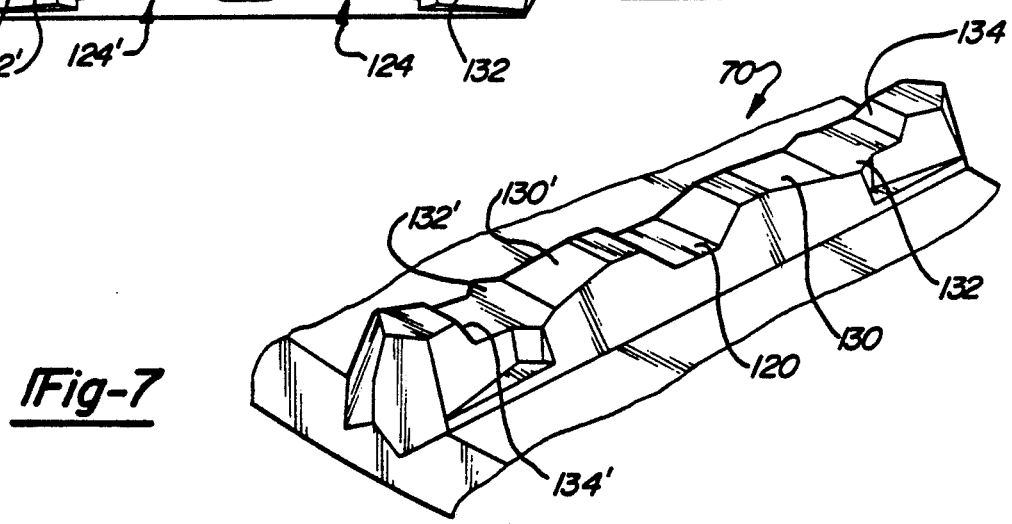
FIG. 7 is an enlarged perspective view of the shift sleeve spline tooth profile shown in FIG. 4.

FIGS. 5 and 6 illustrate the interaction of struts 112 and shift sleeve 26 in the "neutral position" and an exemplary rightwardly disposed axial position of shift sleeve 26, as it is being moved toward first speed gear 32. Compression springs 110 are further compressed upon struts 112 being displaced from the "neutral" position upon axial movement of sleeve 26 following completion of the speed synchronization operation. FIG. 6 illustrates that upon continued rightward axial displacement of shift sleeve 26, struts 112 exit detent groove 120 such that springs 110 urge struts 112 into engagement with ramped groove 124'. Ramp groove 124' is designed to counteract and significantly minimize the frictional drag forces typically encountered when completing a shift following synchronization. More particularly, ramped surface 124' extends at a ramp angle "α", relative to a longitudinal axis, which is of sufficient magnitude to produce an axially directed force from the radially directed biasing of compression springs 110 for urging shift sleeve in a rightward axial direction. The magnitude of ramp angle "α" is preferable set at least equal to or greater than the friction angle associated with the materials from which struts 112 and sleeve spline surface 70 are fabricated (i.e., lubricated steel on steel). As will be appreciated, the interaction of struts 112 and ramp surface 130 upon leftward axial movement of shift sleeve 26 toward second speed gear 30 is identical to that described with reference to FIG. 6.

In typical prior art strut-type synchronizer applications, the radially directed biasing force of the spring member (or other thrust member) caused an excessive frictional drag force upon engagement of the strut with the planar shift sleeve spline surface located adjacent the central detent groove. This frictional drag force causes increased resistance to shifting of shift sleeve 26 which must be overcome by the vehicle operator. Heretobefore, the compressive force of the spring member was a compromise between minimizing shift resistance while still providing adequate contact between the strut and the sleeve splines. According to the present invention, the compressive force of springs 110 may be greater than that previously used for urging sleeve 26 toward completion of a shift at all times. Upon full extension or travel of shift sleeve 26 in either axial direction, strut 112 is restrained within groove 124 and 124' by hump 118 engaging blocking surface 134 or 134', respectively, for inhibiting struts 112 from pressing on the opposite blocker ring. In addition, ramped surfaces 130 and 130' are designed to also act as a strut guide for maintaining proper alignment of struts 112 within slots 114.

As noted, the present invention permits application of coil springs 112 having a greater compressive force for automatically urging sleeve 26 toward completion of its axial travel. Additionally, since an individual coil spring 110 is used with each strut 112, improved retention of struts 112 in detent groove 120 is achieved.

The foregoing discussion discloses and describes merely an exemplary embodiment of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. In a synchronizer clutch and gear assembly comprising, a longitudinally extending main shaft having an externally splined hub fixed thereon, a first gear journally mounted on said main shaft adjacent one axial side of said hub and having an externally splined tooth surface, a shift sleeve having an internally splined tooth surface slidably intermeshed with said hub external splined tooth surface for axial movement thereon in a first direction from a neutral position to an operative position such that upon said shift sleeve internally splined tooth surface being moved into engagement with said first gear spline surface said clutch is operative to couple said first gear in rotation with said main shaft, a blocker ring having first friction surface means and defining a clearance with cooperating second friction surface means adapted for rotational movement with said main shaft, a strut adapted to engage said internally splined tooth surface of said shift sleeve, spring means for urging said strut into engagement with said shift sleeve such that said strut moves into engagement with said blocker ring during the axial shifting operation of said shift sleeve toward said first gear to effect frictional engagement of said first and second friction surface means, the improvement comprising;

ramped groove means circumferentially formed on said internally splined tooth surface of said shift sleeve such that said spring means acts to bias said strut into engagement with said ramped groove means when said strut is moved out of said neutral position upon axial movement of said shift sleeve toward said operative position, wherein said ramped groove means comprises:

a longitudinally extending and radially outwardly inclined surface formed in said internally splined tooth surface of said shift sleeve, said inclined surface defining a ramp angle relative to a longitudinal axis of said shift sleeve which is substantially equal to or greater than the friction angle between said strut and said shift sleeve internal splines, wherein said spring means coacts with said ramped groove means for generating an axially directed engagement force between said strut and said inclined surface for reducing frictional resistance to continued axial movement of said shift sleeve in said first direction upon synchronized engagement with said first gear splined surface;

stop means for limiting the axial movement of said shift sleeve in said first direction to a predetermined maximum length of axial travel; and surface means provided intermediate a first end of said inclined surface and said stop means for coacting with said spring means to exert a substantially radially directed force on said strut, said surface means extending substantially parallel to said longitudinal axis and being operable for increasing frictional resistance to continued axial movement of said shift sleeve in said first direction prior to said shift sleeve engaging said stop means.

2. The synchronizer clutch assembly of claim 1 wherein said strut is disposed for radial and axial movement in a longitudinally extending notch formed in the outer circumference of said hub, and wherein said spring means is a helical compression spring disposed within said notch intermediate said hub and said strut.

3. The synchronizer clutch assembly of claim 1 wherein said strut is adapted to engage a transverse end surface of said blocker ring for moving said blocker ring toward said first gear.

4. The synchronizer clutch assembly of claim 1 further comprising a detent groove circumferentially formed in said internally splined tooth surface of said shift sleeve adjacent a second end of said inclined surface for defining said neutral position, said strut having a stop projection engagable with said detent groove.

5. The synchronizer clutch assembly of claim 4 further comprising;

a second gear journally mounted on said main shaft adjacent the other axial side of said hub and having an externally splined tooth surface;

said shift sleeve being axially movable in a second direction from said neutral position to a second operative position such that upon said internally splined tooth surface of said shift sleeve being moved into engagement with said second gear spline surface said clutch is operative to couple said second gear in rotation with said main shaft;

a second blocker ring having third friction surface means defining a clearance with cooperating fourth friction surface means adapted for rotational movement with said main shaft; and wherein said ramped groove means defines a second longitudinally extending and radially outwardly inclined surface formed on said internally splined tooth surface of said shift sleeve such that said first inclined surface is provided for reducing frictional resistance upon shifting into said first gear and said second inclined surface is provided for reducing frictional resistance upon shifting into said second gear.

6. A manual transmission double-acting synchronizer clutch and gear assembly comprising:

a main shaft with said clutch located intermediate first and second gears journally mounted on said shaft, each of said gears having an external splined tooth surface concentrically formed thereon;

a clutch hub fixed on said main shaft intermediate said gears and having an external splined tooth surface;

a shift sleeve having an internal splined tooth surface intermeshed with said hub external splined tooth surface and adapted for slidable axial travel relative to said hub in a first and second direction for selectively engaging said first and second gear splined tooth surfaces, respectively, so as to alternately couple said first and second gears for rotation with said main shaft;

a first blocker ring concentrically surrounding said main shaft intermediate said first gear and said clutch hub, said first blocker ring having a first conical friction surface defining a clearance with a cooperating second friction surface means adapted for rotational movement with said main shaft;

a second blocker ring concentrically surrounding said main shaft intermediate said second gear and said clutch hub, said second blocker ring having a third conical friction surface defining a clearance with cooperating fourth friction surface means adapted for rotation with said main shaft;

strut means confined within axially extending notches formed in the outer periphery of said clutch hub for moving one of said first and second blocker rings toward its associated gear during axial shifting operation of said shift sleeve so as to effect frictional engagement of said one blocker ring's associated conical friction surface with its associated gear conical friction surface means for generating cone torque therebetween;

spring means for biasing said strut means radially outwardly into contact with said internal splined tooth surface of said shift sleeve, said spring means urging said strut to move axially into engagement with said one blocker ring upon corresponding axial movement of said shift sleeve;

said internal splined tooth surface of said shift sleeve forming a circumferential detent groove for defining a neutral position and ramped groove means on opposite axial sides of said detent groove for enabling said shift sleeve to be selectively shifted in said first and second directions into synchronized engagement with said first and second gears, respectively, wherein said ramped groove means comprises;

longitudinally extending and radially outwardly inclined surfaces formed on said internal splined tooth surface of said shift sleeve on opposite axial sides of said detent groove, said inclined surfaces defining a ramp angle relative to a longitudinal axis of said shift sleeve which is substantially equal to or greater than the friction angle between said strut means and said shift sleeve internal splines, said inclined surfaces adapted to coact with said spring means for reducing frictional resistance to said shift sleeve being axially shifted following synchronization;

stop means for limiting the axial movement of said shift sleeve in said first and second directions to a predetermined maximum length of axial travel; and surface means provided intermediate said inclined surfaces and said stop means for coacting with said spring means to exert a substantially radially directed force on said strut means, said surface means being substantially parallel to said longitudinal axis and operable for increasing frictional resistance to continued axial movement of said shift sleeve in said first and second directions prior to said shift sleeve engaging said stop means.

7. The double-acting synchronizer clutch and gear assembly of claim 6 wherein said strut means is disposed for radial and axial movement in said longitudinally extending notches formed in the outer circumference of said hub such that said strut means is adapted to engage a transverse end surface of said blocker rings for moving said blocker rings toward its associated gear, and wherein said spring means is a helical compression spring disposed within said notches intermediate said hub and said strut means.

8. In a double-acting gear synchronizer clutch assembly comprising:

fore and aft gears journally mounted on a main shaft, each of said gears having an externally splined surface formed thereon;

an externally splined hub fixed on said shaft intermediate said gears;

fore and aft blocker rings surrounding said shaft on opposite sides of said hub and each having a first conical friction surface defining a clearance with a cooperating second conical friction surface associated with said gears;

a shift sleeve encircling said hub and having internal spline teeth in continual engagement with said hub external spline teeth, said shift sleeve being axially movable in either a fore or aft direction such that said shift sleeve internal spline teeth are adapted to selectively engage said fore or aft gear externally splined surfaces;

a plurality of strut members confined within longitudinally extending notches formed in the outer periphery of said hub; and spring means for urging said struts into engagement with said shift sleeve internal spline teeth, said struts adapted to engage one of said blocker rings during the axial shifting operation of said shift sleeve to effect frictional engagement of its associated first and second conical friction surfaces for developing cone torque therebetween for rotating said blocker ring in one direction to an indexed position;

whereby when the index torque developed in said indexed position exceeds the cone torque said blocker ring is rotated in the opposite direction for allowing said shift sleeve internal splines to pass into lock-up engagement with its associated gear external splined surface to permit said shift sleeve to thereafter complete its full axial travel, the improvement wherein;

said internal spline teeth of said shift sleeve form a circumferential detent groove for defining said neutral position, and first and second ramped groove means formed on opposite axial sides of said detent groove configured to coact with said spring means for reducing the frictional drag force generated by said struts acting on said ramped groove means upon continued axial movement of said shift sleeve to its full axial travel position, wherein each of said first and second ramped groove means comprises:

longitudinally extending and radially outwardly inclined surfaces formed in said internal splined tooth surface of said shift sleeve;

stop means for limiting the axial movement of said shift sleeve in said fore and aft directions to a predetermined maximum length of axial travel; and surface means provided intermediate said inclined surfaces and said stop means for coacting with said spring means to exert a substantially radially directed force on said struts, said surface means being operable for increasing frictional resistance to continued axial movement of said shift sleeve in said fore and aft directions prior to said shift sleeve engaging said stop means.

9. The double-acting synchronizer clutch and gear assembly of claim 8 wherein said struts are disposed for radial and axial movement in said longitudinally extending notches formed in the outer circumference of said hub such that said struts are adapted to engage a transverse end surface of said blocker rings for moving said blocker rings toward its associated gear, and wherein said spring means is a helical compression spring disposed within said notches intermediate said hub and said struts.

10. A transmission synchronizer comprising:
   a hub member rotatably supported on a main shaft of a motor vehicle transmission and having an externally splined surface, said hub having an axially extending notch on the outer circumference thereof;
   a shift sleeve having an internal splined tooth surface non-rotatably mounted over and slidably engaging said hub external splines,
   a blocker ring disposed axially with respect to said hub;
   a strut positioned within said notch and adapted for radial and axial movement therein;
   spring means for biasing said strut into engagement with a neutral detent groove circumferentially formed in said shift sleeve internal splined tooth surface for axial movement with said shift sleeve until said strut engages said blocking ring;
   said shift sleeve internal splined tooth surface having ramped groove means circumferentially formed thereon adjacent said neutral detent groove, said ramped groove means including a longitudinally extending and radially outwardly inclined surface formed in said internal splined tooth surface of said shift sleeve, said inclined surface defining a ramp angle relative to a longitudinal axis of said shift sleeve which is substantially equal to or greater than the friction angle between said strut and said shift sleeve internal splines, and said ramped groove means including a planar longitudinal surface adjacent an outer end of said inclined surface and a stop surface adjacent an opposite end of said planar longitudinal surface for limiting the axial movement of said shift sleeve.

* * * * *